June 11, 1963 C. W. FORRESTER 3,093,062

MACHINES FOR MAKING CRUMPETS AND THE LIKE

Filed March 21, 1961 5 Sheets-Sheet 1

INVENTOR
*Charles William Forrester*

BY McCoy, Greene & Le Grotenhuis
ATTORNEYS

June 11, 1963 C. W. FORRESTER 3,093,062

MACHINES FOR MAKING CRUMPETS AND THE LIKE

Filed March 21, 1961 5 Sheets-Sheet 2

INVENTOR

*Charles William Forrester*

BY *McCoy, Greene & Te Grotenhuis*

ATTORNEYS

June 11, 1963 C. W. FORRESTER 3,093,062

MACHINES FOR MAKING CRUMPETS AND THE LIKE

Filed March 21, 1961 5 Sheets-Sheet 3

INVENTOR
*Charles William Forrester*
BY *McCoy, Greene & Te Grotenhuis*
ATTORNEYS June 11, 1963 C. W. FORRESTER 3,093,062

MACHINES FOR MAKING CRUMPETS AND THE LIKE

Filed March 21, 1961 5 Sheets-Sheet 4

INVENTOR

*Charles William Forrester*

BY McCoy, Greene & Te Grotenhuis

ATTORNEYS

June 11, 1963 C. W. FORRESTER 3,093,062

MACHINES FOR MAKING CRUMPETS AND THE LIKE

Filed March 21, 1961 5 Sheets-Sheet 5

INVENTOR

Charles William Forrester

BY McCoy, Greene & TeGrotenhuis

ATTORNEYS

United States Patent Office 3,093,062

Patented June 11, 1963

3,093,062

MACHINES FOR MAKING CRUMPETS AND THE LIKE

Charles William Forrester, 198 Jasper Road, Bentleigh, near Melbourne, Victoria, Australia Filed Mar. 21, 1961, Ser. No. 97,313
9 Claims. (Cl. 99—423)

This invention relates to machines for making crumpets and the like such as muffins, drop scones, pancakes and pikelets, and refers particularly to a machine incorporating an endless conveyor provided with hot plates and means for conveying mould ring plates to the hot plates and picking up the mould ring plates from the hot plates after the products have been cooked.

Machines are known incorporating a hot plate conveyor consisting of a series of hot plates secured to the conveyor and moving with the conveyor with controlled intermittent motion.

Known means of feeding mould rings to such a hot plate conveyor comprise a magazine at one end of the conveyor adapted to feed mould rings to each hot plate, the feeding means on the magazine operating intermittently in synchronism with the intermittent drive means of the conveyor.

Other known means for feeding mould rings to the hot plate conveyor comprise an intermittently or continuously moving endless conveyor carrying mould plates fastened thereto having a plurality of mould rings formed or located therein, the mould plate conveyor travelling with the mould plates over the hot plate conveyor during the cooking of the crumpets. It is also known to intermittently feed mould ring plates onto fixed guide rails extending along and above the cooking zone of the hot plate conveyor, the mould plates being supported on the hot plates for movement therewith and guided by the guide rails to a position after the end of the cooking zone wherein the mould plates are lifted from the fixed guide rails and returned to the beginning of the hot plate conveyor for refilling and cooking as before.

In the latter two types of machines, the cooked crumpets are left on the hot plates when the mould ring plates are removed therefrom, and scraper knife devices remove the crumpets from the hot plates.

In the former type of machine employing loose mould rings, scraper knife means remove the crumpets with their enclosing mould rings from the hot plates and the crumpets are then removed from the rings by manual means.

Dough dispensing means are provided in each of the above machines to feed measured quantities of dough to each mould ring at the beginning of the cooking phase when the mould rings are in contact with the hot plates.

In the latter two types of machines, mould ring greasing mechanisms are also provided in the systems before the moulds are returned to the hot plates.

Movable hot plate browning means are also provided in some constructions of the previous types of machines for browning the tops of the crumpets near the end of the cooking zone. These browning means are adapted to move from an upper "non-browning" position to a lower "browning" position immediately above the mould rings for a predetermined period to effect browning of the crumpets on top.

The advantages of the latter two types of machines over the loose ring machine lie in their automatic return of the mould ring plates to the beginning of the cooking zone without the requirement of manually removing the crumpets from the rings and charging the magazine with greased rings after the crumpets have been so removed. In effect the latter two types of machines provide a continuous automatic crumpet cooking arrangement whereas formerly with the loose ring machine, part of the system was performed manually.

However, in the former machine wherein the loose rings sat on the hot plates throughout the cooking zone without being in contact with any other parts extraneous to the hot plates, the crumpet was cooked without any disturbance to the dough during its passage through the cooking zone. In the latter two main types of machines the mould rings in the mould plates are liable to some movement relative to the hot plates by reason of the mould plates being attached to a conveyor or being contained between guide rails. Any wear on the mould plate conveyor or even a small non-synchronous movement between the mould plate conveyor and the hot plate conveyor will impart relative movement between the mould ring and the hot plate. Similarly if any friction or impedance by foreign mater is experienced on the fixed guide rails, relative movement between the mould ring and the hot plate will be experienced.

Such relative movement disturbs the dough being cooked in the mould rings and can have a deleterious effect on many of the products being cooked.

It is an important object of the present invention to provide a machine for cooking crumpets and the like wherein the mould ring plates are automatically fed to, removed from and returned to the hot plate conveyor and wherein the mould rings and their mould plates rest on the hot plates through the cooking zone and are not subject to contact by other parts of the machine.

It is a further object of the present invention to provide a mould ring plate conveyor adapted to convey mould ring plates to the hot plate conveyor at the beginning of the cooking zone and to pick up the mould ring plates at the end of the cooking zone and convey them back to the beginning for the cooking zone. The mould plate conveyor and the hot plate conveyor may operate on either a continuous or intermittent motion system.

Other objects of the invention are to provide for removal of the cooked crumpets from the hot plates, greasing of the mold rings and feeding measured quantities of dough to the mould rings on the hot plates.

According to one aspect of the invention there is provided a machine for cooking crumpets, muffins, drop scones, pancakes, pikelets and like products including a conveyor having hot plates attached thereto, means associated with the conveyor and operable to deliver mould ring plates onto the hot plate conveyor at one end of a cooking zone therein and to pick up the said mould ring plates from the hot plate conveyor at the other end of said cooking zone, the mould ring plates being carried solely by the hot plate conveyor through the cooking zone and out of contact with other parts of the machine.

According to a further aspect of the invention, the machine comprises an endless conveyor having hot plates attached thereto, conveyor means operable to deliver mould ring plates onto the hot plate conveyor at one end of a cooking zone therein and to pick up the said mould ring plates from the hot plate conveyor at the other end of the cooking zone, the mould ring plate conveyor means being adapted to be driven synchronously with the hot plate conveyor, and the mould ring plates being carried through the cooking zone solely by the hot plate conveyor and out of contact with the other parts of the machine.

According to yet another aspect of the invention dough feeding means are provided at a location above the mould ring plates at the beginning of the cooking zone.

Still further features reside in the provision of scraper knife means for removing cooked crumpets from the hot plates at the end of the cooking zone, mould ring greasing alignment and holding means at a location preceding the dough feeding means in the mould ring plate circuit, and top browning means at a location near the end of the cooking zone and above the hot plate conveyor and the mould ring plates carried thereon.

The scraper knife means, the greasing alignment and holding means, the dough feeding means and the top browning means may be operated in synchronism with the hot plate and mould ring plate conveyors.

In order that the invention and its manner of performance may be more fully understood reference will now be made to an embodiment of the invention illustrated in the accompanying drawings, in which.

Figure 1A:
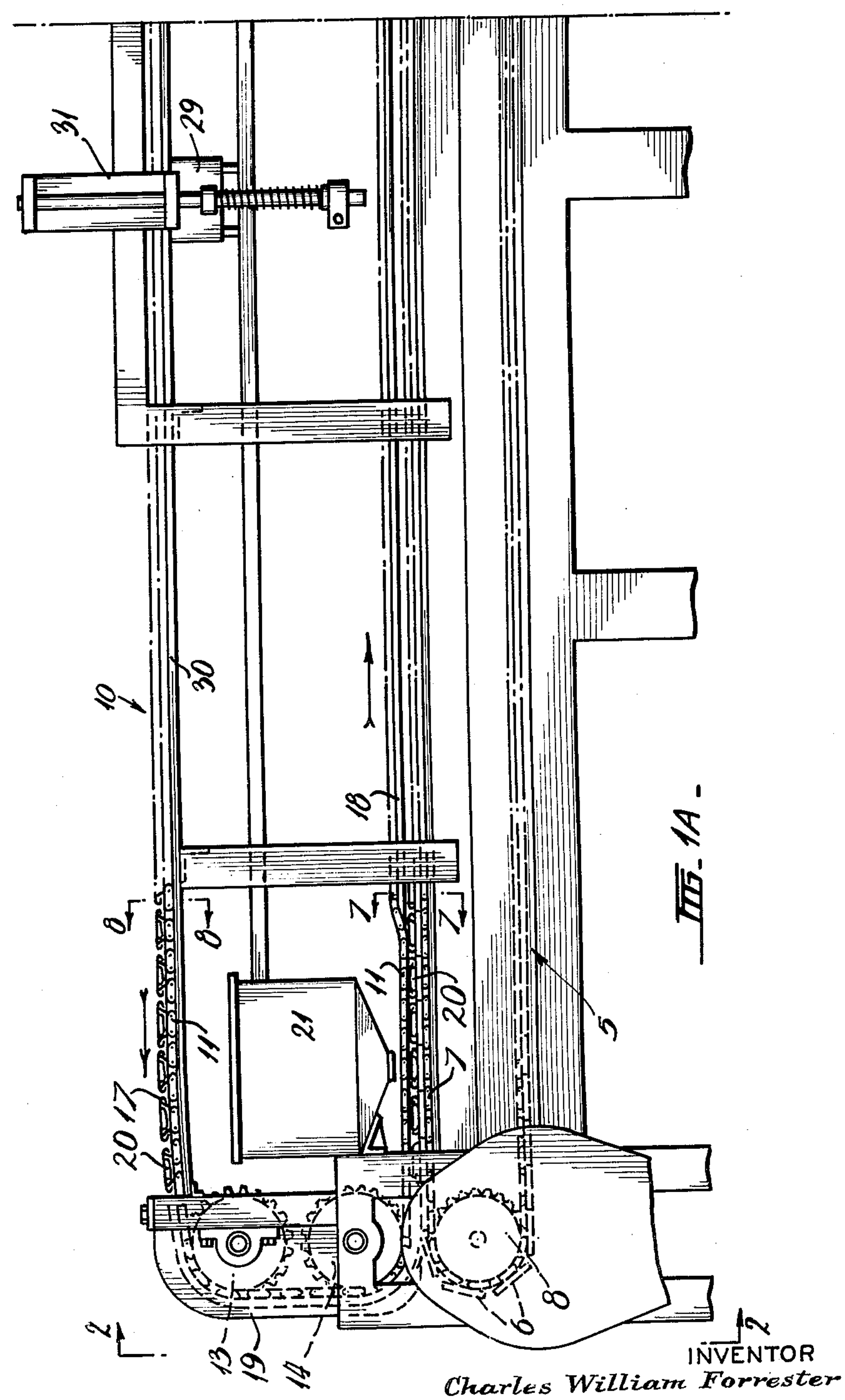
FIGURES 1A and 1B are extended side elevational views of the complete machine.
Figure 1B:
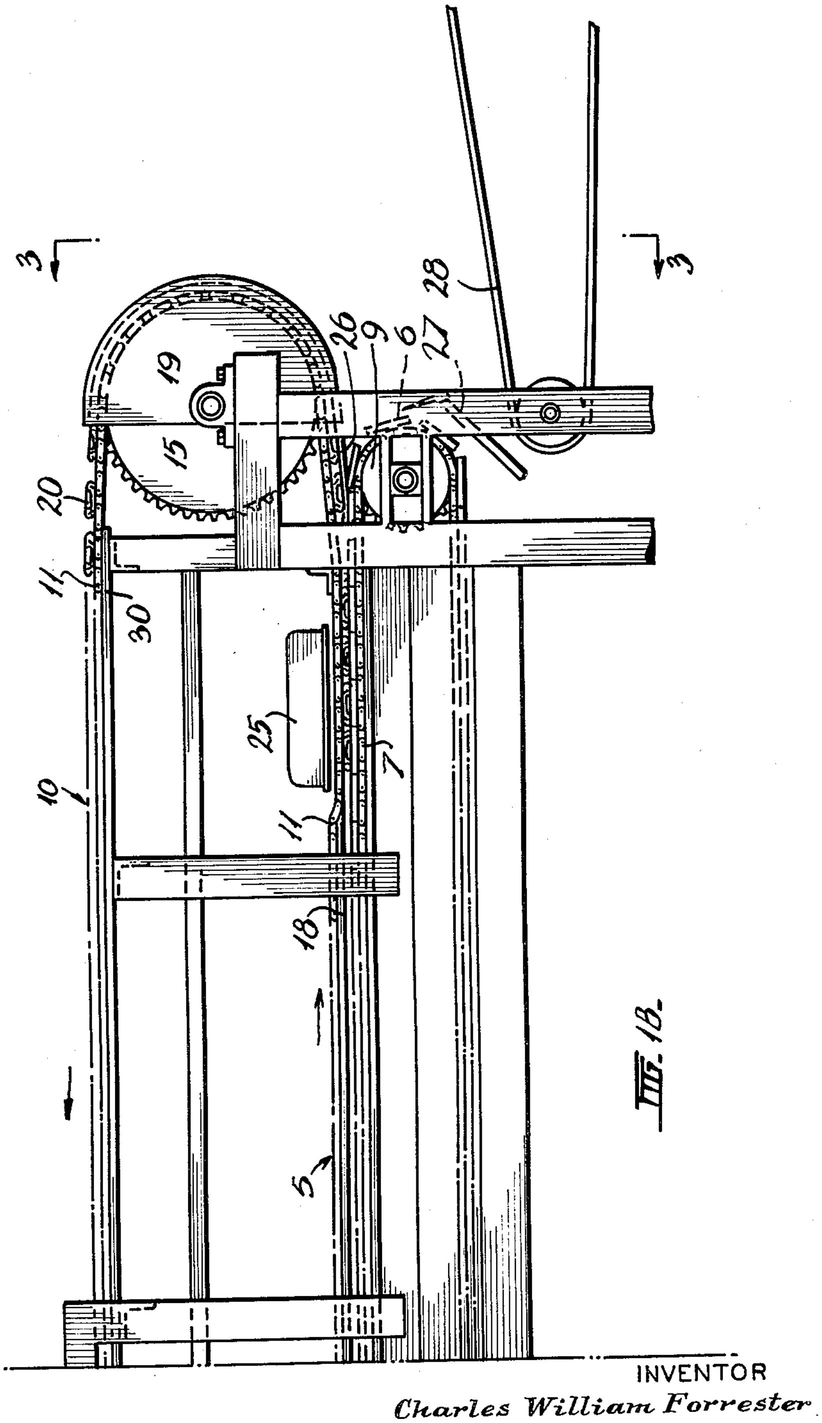
Figure 2:
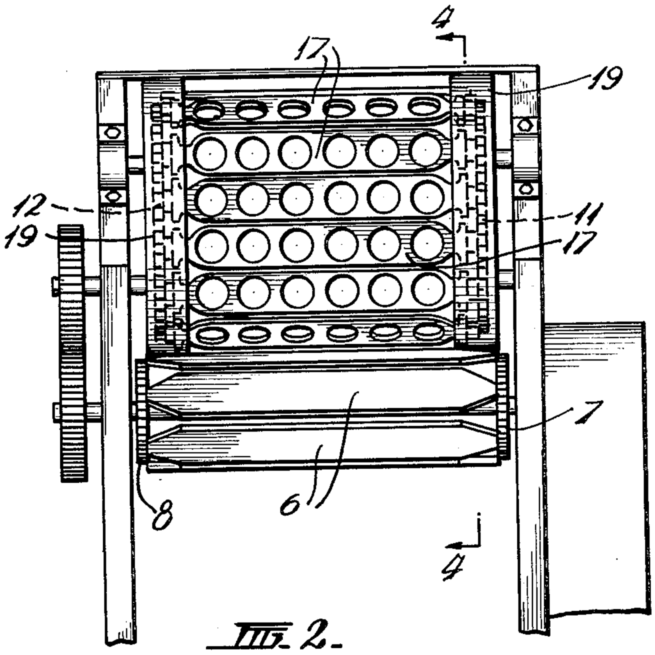
FIGURE 2 is an end elevational view along the line 2—2 of FIGURE 1A in the direction of the arrows.
Figure 3:
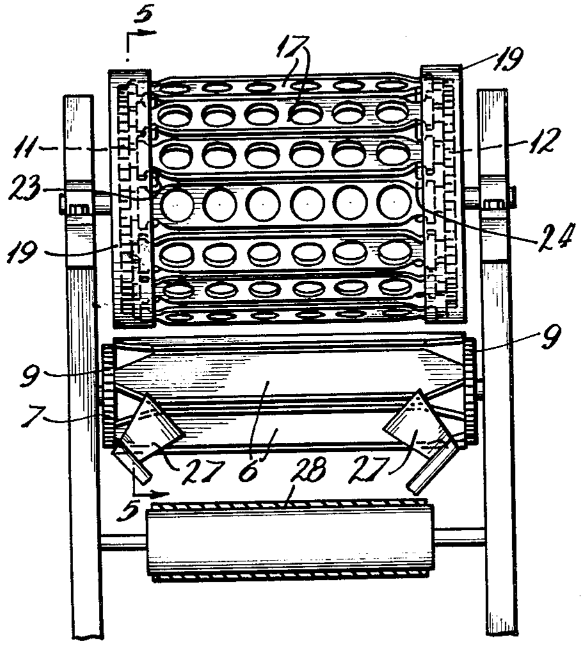
FIGURE 3 is an end elevational view similar to that of FIGURE 2 but of the other end of the machine along line 3—3 of FIGURE 1B in the direction of the arrows.
Figure 4:
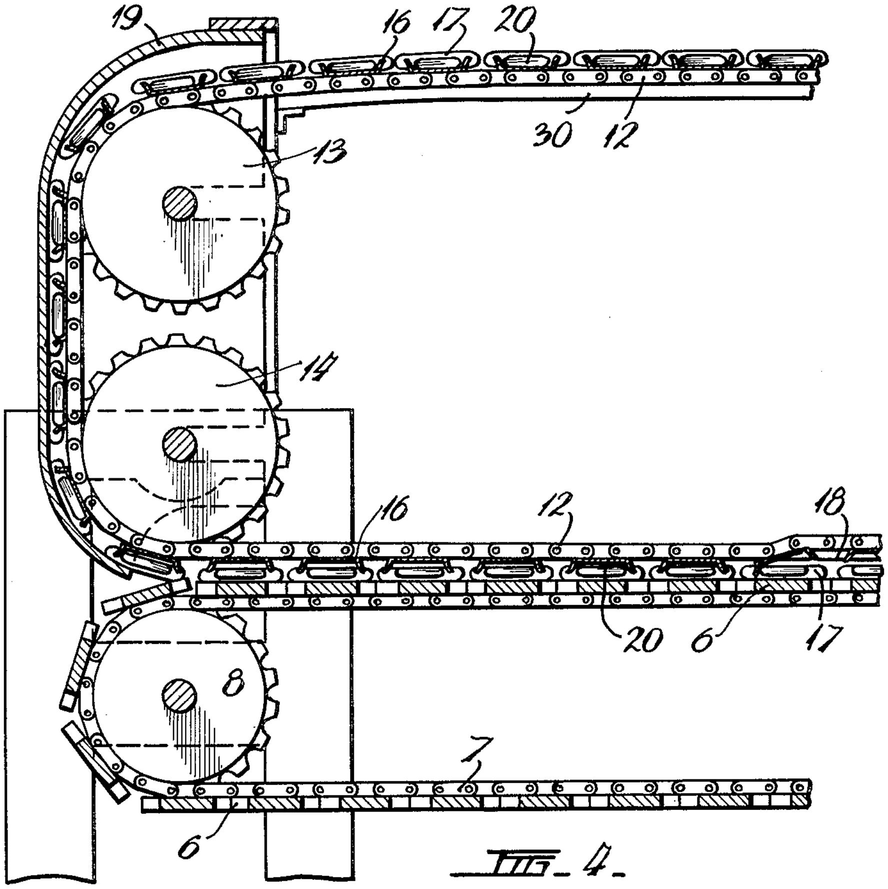
FIGURE 4 is an enlarged side elevational part sectional view of the end of the machine illustrated in FIGURE 2 and taken along the line 4—4 of FIGURE 2 in the direction of the arrows.
Figures 7, 8:
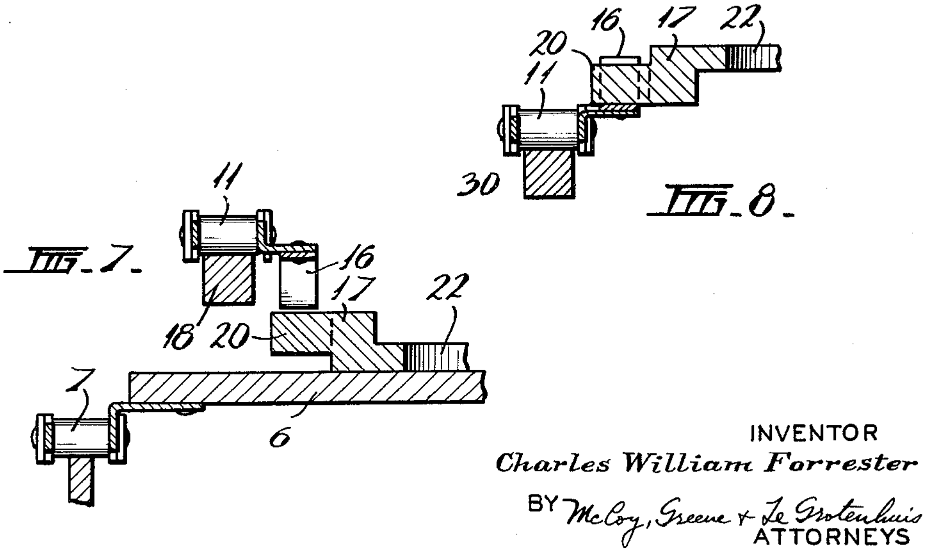
Figures 5, 6:
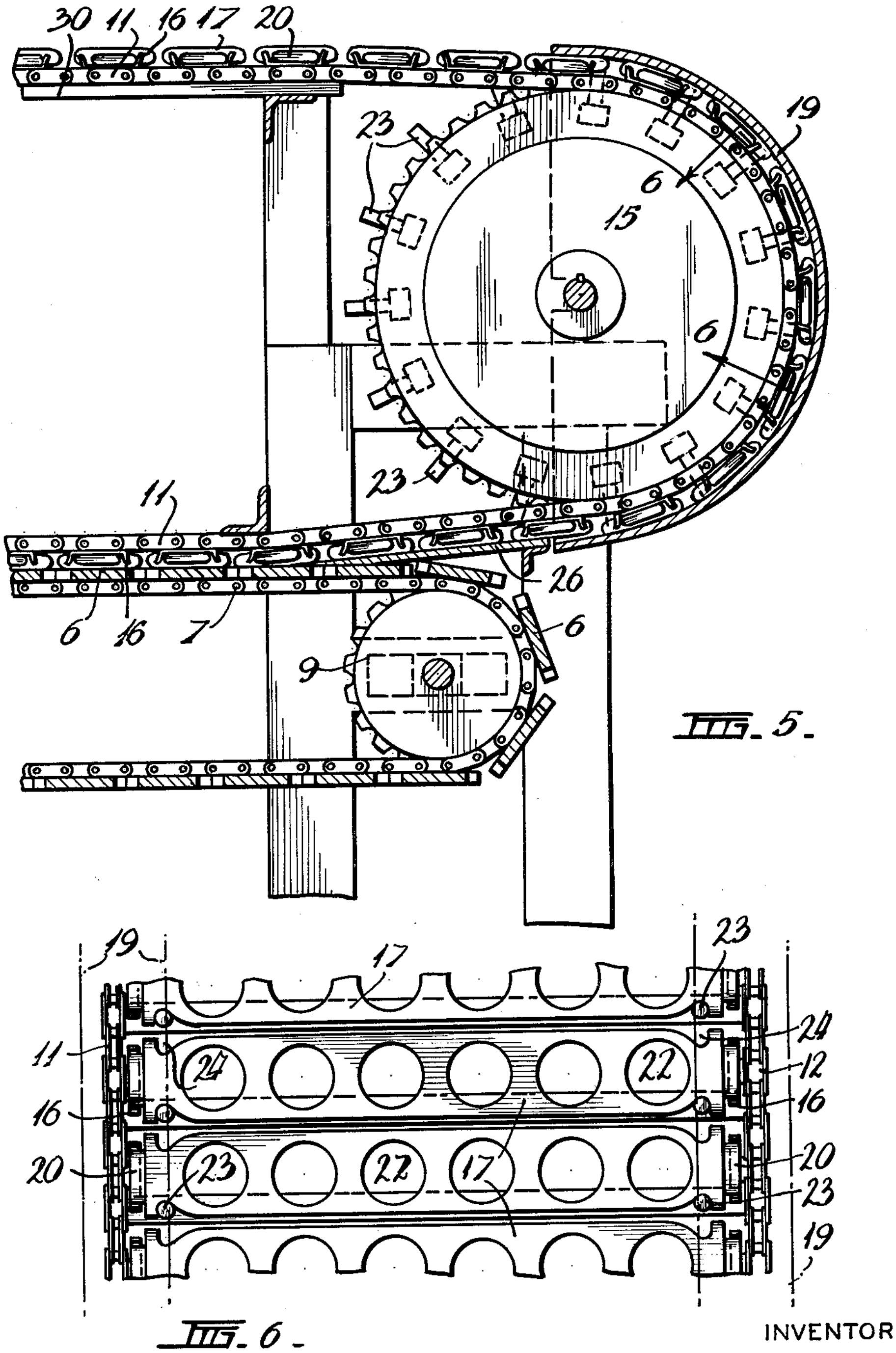
FIGURE 5 is an enlarged side elevational part sectional view similar to that of FIGURE 4 but of the other end of the machine taken along the line 5—5 of FIGURE 3 in the direction of the arrows.
FIGURE 6 is an end view of the mould ring plates of the machine on the sprocket shown in FIGURE 5, illustrating the mould rings in plan view and taken along the line 6—6 of FIGURE 5 in the direction of the arrows.

FIGURE 7 is a sectional view of one side of the lower run of the mould ring plate conveyor and hot plates showing the means for moving the mould ring plate conveyor away from the hot plates and the mould ring plates in the cooking zone taken along the line 7—7 of FIGURE 1A in the direction of the arrows; and FIGURE 8 is a sectional view similar to FIGURE 7 of the upper run of the mould ring plate conveyor showing the mould ring plates supported by the conveyor, taken along the line 8—8 of FIGURE 1A in the direction of the arrows.

Referring to the drawings, the hot plate conveyor 5 consists of a series of hot plate sections 6 fastened to an endless conveyor 7 mounted in the machine and supported on guide rails at the sides thereof so as to provide both an upper and a lower horiozntal run, the conveyor 5 at its ends passing around sprocket wheels 8 and 9. Gas jets or other heating means are incorporated in the space enclosed by the conveyor and operate to heat the upper run of the conveyor hot plates and thus provide a cooking zone.

Mounted above the hot plate conveyor 5 there is located an endless conveyor 10 comprising two endless chains 11 and 12 mounted on and supported by guide rails at the sides of the machine, both chains moving in the same plane and spaced apart a predetermined distance. Conveyor 10 also consists of two horizontal runs with the ends passing around sprocket wheels 13 and 14 at one end and sprocket wheel 15 at the other end.

Located on the inside edge of each chain 11 and 12 are channel shaped members 16 adapted to engage with and receive in carrying and guiding relation therewith mould ring plates 17 on the upper run of conveyor 10 and on the upper arcs of conveyor 10 at its passes over the end sprockets 13, 14 and 15. When the members 16 pass, with their attached chains 11 and 12, on the lower run of conveyor 10 adjacent the top run of hot plate conveyor 5, the mould ring plates 17 are not supported by conveyor 10, which on the major portion of its lower run over the hot plates 6 is directed by means of guide rails 18 having an inclined lead-in section to run above and clear of the mould ring plates released therefrom and resting on the hot plates.

To ensure that the mould ring plates 17 will not drop from members 16 on the lower arcs of the end sprockets, curved guides or bands 19 are provided to hold the mould ring plates in engagement with conveyor 10.

Pins or studs 23 are provided on sprockets 15 to assist members 16 in lifting the mould ring plates 17 upwards around sprocket 15. Pins 23 engage in notches 24 near the ends of the mold ring plates.

The channel shaped members 16 engage around flat projecting lugs 20 on the ends of the mould ring plate 17, the clearance between members 16 and lugs 20 being sufficient to ensure positive release of the mould ring plates by gravity on the lower run of the conveyor 10.

The end sprockets of both the hot plate conveyor 5 and the mould ring plate conveyor 10 may be driven separately with intermittent motion or continuous motion in synchronism or may be driven by common drive means.

Located above the mould ring plates 17 at the beginning of the cooking zone is an automatic dough feeding means 21 adjustable to feed a predetermined amount of dough to each ring 22 in a mould plate or plates beneath it. The dough feeding means, of known type, may be connected by linkages and the like to the conveyor drive means so that feeding may take place during the no-motion period of the intermittent drive.

Near the end of the cooking zone a vertically reciprocating top browning plate 25 is located. This plate is heated by known means and adapted, in synchronism with the movement of the hot plate conveyor, to move from a position remote from the mould ring plates on the hot plates to a position adjacent the tops of the mould ring plates for a predetermined period to effect quick browning of the tops of the crumpets. If the hot plate conveyor is driven continuously, then a similar mechanism to that used with the dough feeding means is employed to ensure correct positioning of the browning means over the mould ring plates during their travel on the hot plates.

Immediately before the mould ring plates 17 pass through the top browning zone, the mould ring plate conveyor is directed down towards the plates off guide rails 18 so that members 16 engage around lugs 20 on the mould ring plates which are then guided, by means of lead-off guides 26 and the curved guides 19 and assisted by pins 23 up over the end sprockets 15 to the top run of the mould ring plate conveyor where the mould ring plates are fully supported by conveyor 10 through members 16, the chains 11 and 12 being supported on guide rails 30.

When the mould ring plates 17 begin to move up lead-off guides 26 from hot plates 6 the hot plate conveyor 5 is turning down over its end sprockets with the cooked crumpets adhering to the hot plates.

Scraper knife means 27 of the swinging type are mounted adjacent this end of hot plate conveyor 5 and operate to remove the cooked crumpets from the hot plates and allow them to drop to a collecting means or removal conveyor 28.

The mould ring plates 17 as they pass along the top run of conveyor 10 to the end sprockets 13 and 14 at the beginning of the cooking zone are greased by a known type of reciprocating greasing mechanism generally noted at 29 either wiping or spraying. The greasing mechanism 29 operates during the no-motion period when the drive is intermittent and if the drive is continuous a similar mounting mechanism to that used with the dough feeding means and browning means is employed.

Operating in conjunction with the greasing mechanism 29 is a mould ring plate alignment and holding means 31 operably connected for synchronised movement with the greasing mechanism 29.

Alternatively, the mould rings may be treated with silicone oil during a shut-down period thus requiring further treatment only at widely spaced intervals.

Although the greasing means in this embodiment is located in the upper run of conveyor 10, it will be appreciated that it may be located at any position before or after the lower run of conveyor 10.

With a machine of the above embodiment the mould ring plates in their passage through the cooking zone rest on the hot plate sections and are carried thereby without contacting any other parts of the machine thus ensuring that the dough mixture being cooked in the mould rings is not disturbed in the cooking zone and an excellently cooked product is thus achieved.

I claim:

1. A machine for cooking crumpets, muffins, drop scones or like products including a first endless driven conveyor having upper and lower horizontal runs and having hot plates attached thereto; a second endless conveyor detachably supporting mould ring plates and adapted to be driven synchronously with the hot plate conveyor, said second conveyor having upper and lower horizontal runs, the lower run of said second conveyor being located adjacent to and above the upper run of said first conveyor; a cooking zone; means for release of the mould ring plates from said second conveyor onto the upper run of said first conveyor at the forward end of the cooking zone and means for re-engaging the mould ring plates with said second conveyor and picking up the mould ring plates from said first conveyor at the rearward end of the cooking zone, the mould ring plates being carried through said cooking zone solely by the upper run of the hot plate conveyor and out of contact with other parts of the machine.

2. A machine according to claim 1 wherein the conveyors each comprise a pair of spaced apart endless chains.

3. A machine for cooking crumpets, muffins, drop scones or like products including a first endless driven conveyor comprising upper and lower horizontal runs of chain, extending between sprocket gears at each end of the machine, and having hot plates attached thereto, a second endless conveyor comprising upper and lower horizontal runs of chain extending between sprocket gears at each end of the machine and operable in synchrony with said first conveyor, the lower run of said second conveyor being located adjacent to and above the upper run of the said first conveyor which includes a cooking zone, the chains of said second conveyor being provided with channel-shaped support members for detachably supporting a plurality of mould ring plates and delivering said plates onto the upper run of said first conveyor at one end thereof, re-engaging with said mould plates at the other end thereof and guiding said mould plates away from the upper run of the first conveyor, the mould ring plates being carried through said cooking zone solely supported by the upper run of said first conveyor and out of contact with other parts of the machine.

4. A machine according to claim 3 wherein arcuate guide members are located at the end of said second conveyor around the sprocket gears to hold the said mould plates in engagement with the support members during the upward and downward travel of the mould ring plates over the sprocket gears.

5. A machine according to claim 3 wherein the channel-shaped support members engage with projecting lugs on the ends of the mould plates.

6. A machine according to claim 3 wherein the sprocket gears of said second conveyor, over which the conveyor and mould ring plates pass in an upward direction, is provided with radially projecting pins engaging with the mould ring plates to assist in lifting said plates around the sprocket gears.

7. A machine for cooking crumpets, muffins, drop scones or like products including a first endless driven conveyor comprising upper and lower horizontal runs extending between sprocket gears at each end of the machine and having hot plates attached thereto, a second endless conveyor comprising upper and lower horizontal runs extending between sprocket gears at each end of the machine, the lower run of said second conveyor being located adjacent to and above the upper run of said first conveyor, which includes a cooking zone, said second conveyor detachably supporting mould ring plates and being operable to deliver the mould ring plates onto the upper run of said first conveyor at one end thereof and to pick up said mould plates from said first conveyor at the other end thereof, guide means adjacent said lower run of said second conveyor to lift said second conveyor away from said first conveyor at the beginning of said cooking zone leaving the mould ring plates on said first conveyor and to return said second conveyor downwards into engagement with said mould ring plates at the end of said cooking zone, said second conveyor being adapted to be driven synchronously with said first conveyor and said mould ring plates being carried through said cooking zone solely by the upper run of said first conveyor and out of contact with other parts of the machine.

8. A machine for cooking crumpets, muffins, drop scones or like products including a first driven conveyor having a horizontal run and having hot plates attached thereto; an endless second conveyor detachably supporting mould ring plates and adapted to be driven synchronously with said first conveyor, said second conveyor having upper and lower horizontal runs, the lower run of said second conveyor being located adjacent to and above the run of said first conveyor; a cooking zone; means for release of the mould ring plates from said second conveyor onto the run of said first conveyor at the forward end of the cooking zone; means for re-engaging the mould ring plates with said second conveyor and means for picking up the mould ring plates from said first conveyor at the rearward end of the cooking zone, the mould ring plates being carried through said cooking zone solely by the run of said first conveyor and out of contact with other parts of the machine.

9. A machine for cooking crumpets, muffins, drop scones and like products including a first driven conveyor having a horizontal run and having hot plates attached thereto; an endless second conveyor detachably supporting mould ring plates and operating in synchrony with said first conveyor, said second conveyor having upper and lower horizontal runs, the lower run of said second conveyor being located adjacent to and above the run of said first conveyor; a cooking zone; means for release of the mould ring plates from said second conveyor onto the run of said first conveyor at the forward end of the cooking zone and means for picking up the mould ring plates from said first conveyor at the rearward end of the cooking zone.

References Cited in the file of this patent

UNITED STATES PATENTS 3,058,434 De Jersey ---------------- Oct. 16, 1962

FOREIGN PATENTS 729,275 Great Britain ------------ May 4, 1955